UNITED STATES PATENT OFFICE.

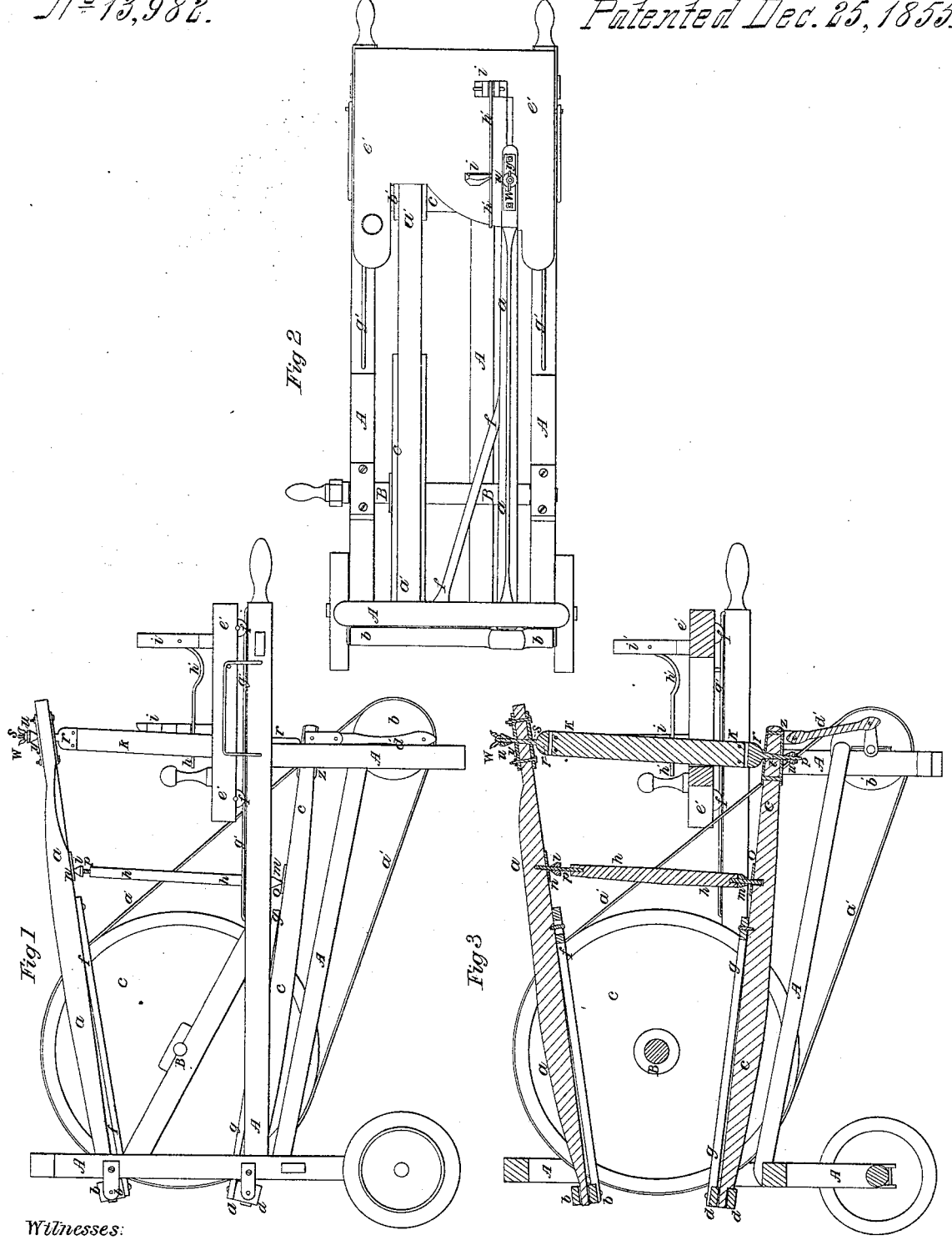

SORANUS DUNHAM, OF NORTH BRIDGEWATER, MASSACHUSETTS.

METHOD OF HANGING SAWS.

Specification of Letters Patent No. 13,982, dated December 25, 1855.

*To all whom it may concern:*

Be it known that I, SORANUS DUNHAM, of North Bridgewater, in the county of Plymouth and State of Massachusetts, have invented certain new and useful Improvements in the Mode of Hanging Saws, and that the following description, taken in connection with the accompanying drawings, forms a full and exact specification of the same, wherein I have set forth the nature and principles of my said improvements by which my invention may be distinguished from others of a similar class, together with such parts as I claim and desire to have secured to me by Letters Patent.

The figures of the accompanying plate of drawing represent my improvements.

Figure 1 is a side elevation of my machine, Fig. 2 is a plan, Fig. 3 is a longitudinal vertical section taken in the plane of the line A B Fig. 2.

The object of my improvements is to get rid of the strain which occurs in the usual mode of hanging the saw in a saw frame, whether said frame is arranged to play up and down in parallel guiding ways or is attached to one or more shafts at the middle or end of said frame so as to balance it and avoid the expenditure of power in the same.

The main features of my machine consist in hanging the upper and lower part which sustain the saw, each upon a rocker shaft, and connecting them by proper regulating and adjustable braces, and giving the saw a reciprocating rectilinear motion by means of a crank or eccentric motion. But the distinguishing novelty of my machine will be found in the mode described of hanging the saw so as to provide for the little necessary play of the same by reason of its reciprocating curvilinear motion and the means of adjustment of the saw in its bearings and frame.

A A A A in the several drawings represents the framework of the machine; B B, the driving shaft having proper bearings in this framework and a driving pulley of larger diameter; C, a band from which drives the shaft, that gives play or motion to the saw.

$a\ a$ is the upper bar or beam of the saw frame and $b\ b$ its rocker shaft with which it plays. $c\ c$ is the lower beam or bar of said frame and $d\ d$ its rocker shaft, both of said rocker shafts having proper bearings at the rear of the machine in the framework.

Angular lateral braces $f\ f$, $g\ g$, pass respectively from the rocker shafts $b\ b$ and $d\ d$ to some point on the underside of the upper and lower beams $a\ a$ and $c\ c$, for the purpose of stiffening the saw frame laterally. If deemed necessary these braces may be made adjustable by having a slot at either end through which a screw works to confine them in any desired position. A vertical regulating and stiffening bar $h\ h$ is set between the upper and lower bars $a\ a$ and $c\ c$ of the saw frame at any proper distance behind the saw $k\ k$. At each end of this bar $h\ h$ is fitted a wedge shaped step $l\ m$ the angle of which sits and plays in a groove formed in a proper plate $n\ o$ set on the under and upper sides respectively of the upper and lower beams $a\ a$ and $c\ c$. The upper step serves as a nut having a female screw cut in it in which the male screw $p$ (set firmly in the upper end of the bar $h\ h$) works as shown in Fig. 3, and by turning this bar around, in one direction or the other (provision being made for the turning in the lower step $m$) the bars $a\ a$ and $c\ c$ will be spread apart or allowed to come together as may be desired.

The saw $k\ k$ is set at each end in a forked plate $r\ r$, and from each of these plates projects upward or downward as the case may require a screw shaft $s\ t$ and each of these shafts plays loosely through the wedge shaped steps $u\ u$ being confined therein by the nuts W X as shown in the sectional drawing Fig. 3. The angles of these wedge shaped steps play in proper grooves in the plates $y\ z$, set on the upper and under side respectively of the beams $a\ a$ and $c\ c$. These several wedge shaped steps tilt in their respective grooves and by so doing when the saw and saw frame are moving with a reciprocating curvilinear motion they provide for the necessary play of the saw $k\ k$ and stiffening bar $h\ h$, at the same time keeping everything properly strained up all the while. An endless band $a'\ a'$ passes from the large pulley C on the driving shaft to and around a small pulley $b'$ on the crank shaft $c'$ a connecting arm $d'$ from which is attached to one end of the lower bar $c\ c$ of the saw frame thereby imparting to it and the saw its proper reciprocating motion.

$e'\ e'$ is the supporting or guiding carriage which is provided with proper trucks $f'\ f'$ by which it is moved forward and back on the rails $g'\ g'$. The drawings represent a machine for cross sawing and the log may be supported on the bent rod $h'$ $h'$ extending between the uprights $i'$ $i'$ on the supporting carriage $e'$ $e'$.

Having thus described my improvements I shall state my claims as follows:

What I claim as my invention and desire to have secured to me by Letters Patent is,

1. The improved mode herein above described of hanging the saw, where the frame in which it is hung has a reciprocating curvilinear motion, so as to provide for the necessary play of the same, at its ends said improved mode consisting in supporting and confining the saw at one end, or both its ends in wedge shaped steps, arranged to tilt in proper grooves in the manner and for the purpose herein above explained.

2. I claim the vertical stiffening and regulating bar with its ends arranged in the wedge shaped steps, and with one end made susceptible of the adjustment herein above explained.

SORANUS DUNHAM.

Witnesses:
 EZRA LINCOLN.
 SAML. N. PIPER.